Dec. 17, 1957  H. GAINES, JR  2,816,778
DRAWBAR ASSEMBLY
Filed May 10, 1957
2 Sheets-Sheet 2
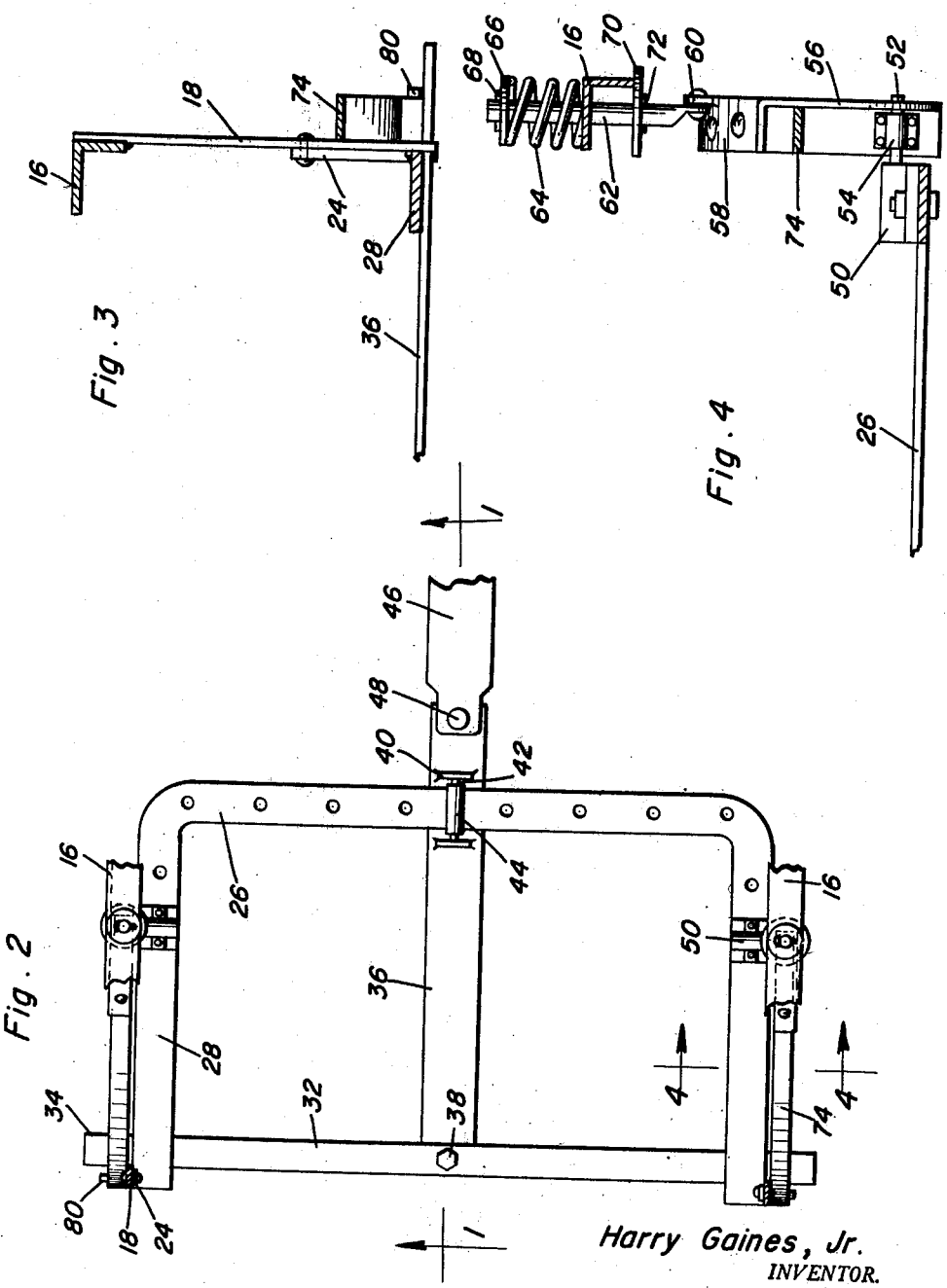
Harry Gaines, Jr.
INVENTOR.

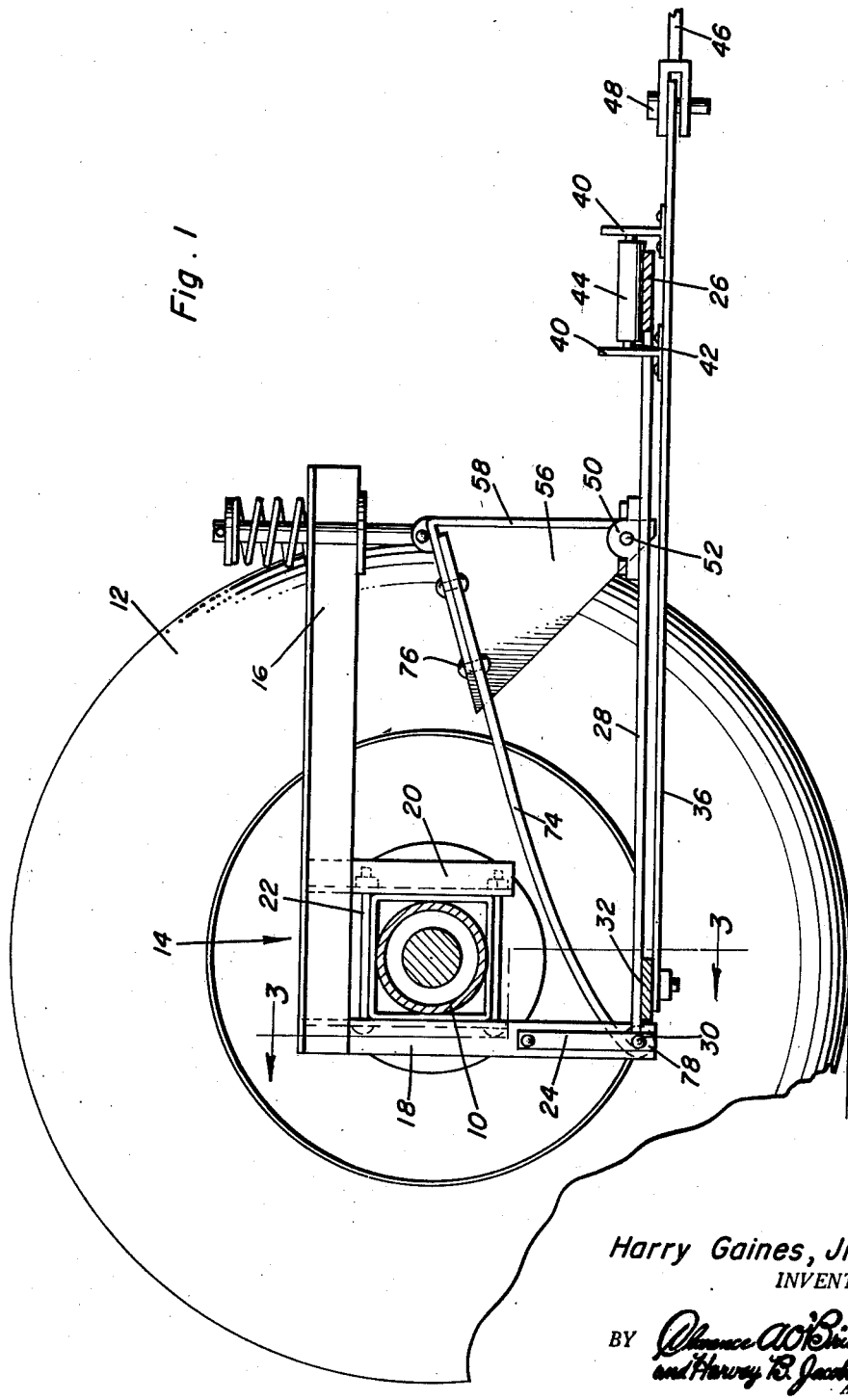

United States Patent Office 2,816,778
Patented Dec. 17, 1957

2,816,778
DRAWBAR ASSEMBLY

Harry Gaines, Jr., Clovis, N. Mex.

Application May 10, 1957, Serial No. 658,386

5 Claims. (Cl. 280—489)

This invention generally relates to a drawbar assembly and more specifically provides an attachment for conventional tractors whereby an implement is secured adjacent the rear axle of the tractor for pulling the implement and constitutes a continuation-in-part of my copending application Serial No. 463,161, now Patent No. 2,800,341 which is a continuation in part of Patent No. 2,702,198.

An object of the present invention is to provide a drawbar assembly in which a portion of the force necessary to pull the implement attached to the drawbar is transferred to a downward force on the traction wheels of the tractor, thereby affording the driving wheels of the tractor with a better traction grip.

Another object of the present invention is to provide a drawbar assembly having a swinging drawbar thereon supported by a roller, whereby the line of application of the force may vary, thus facilitating pulling of the implement around corners.

Another important object of the present invention is to provide a drawbar assembly incorporating construction which provides a stop mechanism when reverse movement is desired.

Another object of the present invention is to provide a drawbar assembly which is rugged and simple in construction, easy to attach, relatively inexpensive to manufacture and extremely simple in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal, sectional view taken substantially upon a plane passing along section line 1—1 of Figure 2 with the additions of portions of the tractor for showing the relationship of the drawbar assembly to the rear axle of the tractor;

Figure 2 is a plan view of a portion of the construction of the present invention with parts thereof broken away;

Figure 3 is a detailed, sectional view taken substantially upon a plane passing along section line 3—3 of Figure 1;

Figure 4 is a detailed, sectional view taken substantially upon a plane passing along section line 4—4 of Figure 2 illustrating structural details of the invention.

Referring now specifically to the drawings, it will be seen that the drawbar assembly of the present invention is attached to a conventional tractor axle housing 10 having ground engaging driving wheels 12 and any other conventional structure normally found in farm-type tractors.

The drawbar assembly is generally designated by numeral 14 and includes a pair of identical assemblies adjacent each end of the tractor axle housing 10 which form mounting brackets therefor. These assemblies include an elongated angle-iron member 16 extending longitudinally rearwardly from the tractor axle housing 10. The angle-iron member 16 is provided with a pair of depending vertical straps 18 and 20, with the front strap 18 being considerably longer than the rear strap 20. A pair of clamp bolts 22 extend through and between the straps 18 and 20 for rigidly securing the straps 18 and 20 and the angle-iron member 16 to the axle housing 10. The details of the clamp structure may be varied, with the necessary structure including the rearwardly extending angle-iron member or beam 16 and the downwardly extending strap 18.

Pivotally supported on the inner surface of each of the depending straps 18 is a supporting link 24 which supports the front ends of the legs of an enlarged U-shaped drawbar member 26. The legs 28 of the U-shaped member 26 extend between the vertical members 18 and are connected to the links 24 by pin 30. A transverse member 32 extends between the free ends of the legs 28 and projects therebeyond, thus forming a stop for engagement with the rear edges of the upright members 18, thus limiting the forward swinging movement of the U-shaped member 26 in relation to the vertical members 18. The projecting ends are designated by numerals 34. Centrally of the cross member 32 is disposed a longitudinally extending drawbar 36 pivotally secured to the transverse member 32 adjacent the center thereof as by a pivot bolt 38. The rear portion of the drawbar 36 is provided with a pair of upstanding lugs 40 on either side of the drawbar member 26, with a shaft 42 extending therebetween in overlying relation to the bight portion of the U-shaped member 26, with a roller 44 being disposed on the shaft 42 for rotation. The roller 44 engages the top surface of the bight portion of the U-shaped drawbar 26, thus permitting swinging movement of the drawbar 36, whereby the tongue 46 of a pulling implement may be attached thereto by a suitable pin 48 for permitting variations in the line of force from the drawbar 36 within certain limits defined by movement of the drawbar 36 about pivot axis formed by bolt 38 within the confines of the lugs 40.

Disposed adjacent the rear end of each leg 28 of the U-shaped member 26 is a bracket 50 having an outwardly extending pin 52 received in a bracket or bearing 54 in a generally triangular shaped plate 56 having edge flanges 58 forming reinforcement therefor. The plate 56 is substantially in the form of an isosceles triangle, with the flange 58 being disposed on the base and one side thereof which is disposed rearwardly, with the juncture of the flange 58 having an upstanding lug 60 pivotally receiving an upwardly extending support rod 62 extending through an aperture in the horizontal flange of the rearwardly extending beam 16. A compression coil spring 64 is in encircling relation to the rod 62 above the beam 16 and is maintained thereon by a washer 66 and a transverse pin 68. Also, a washer 710 and a similar transverse pin 72 underlie the beam 16 for forming a stop when reverse movement occurs. The forwardly extending flange on the base of the plate 56 is rigidly attached to a forwardly extending and downwardly curved leaf spring 74 by employing rivets 76. The front end of the spring 74 is provided with a loop 78 attached to an outwardly projecting prong or peg 80 on the depending members 18.

When a rearward pull is exerted on the U-shaped 26, as would occur when an implement is being drawn by the drawbar 36, the U-shaped member 26 will tend to be drawn rearwardly, thus moving the pin 52 rearwardly, thereby tending to pivot the plate 56 about a transverse axis for flexing the spring 74 downwardly, thus urging a downward force on members 18. The spacing of the washers on the rod 62 is such that substantially no vertical component of force will be exerted to the beam 16 during pivotal movement of the plate 56, whereby the rod 62 acts as a guide rod during the movement thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A drawbar assembly for attachment to the rear axle housing of a tractor comprising a pair of rearwardly extending supporting beams, a pair of downwardly extending straps connected to the front ends of said beams, a drawbar assembly, link means connecting the front end of the drawbar assembly to the vertical supporting straps, a plate member pivotally attached to said drawbar assembly, a flat leaf spring member rigidly interconnecting the top edge of the plate and the vertical support straps, spring means interconnecting the plate and the rearwardly extending beams, whereby rearward movement of the drawbar assembly will cause tilting movement of the plate, thus causing downward flexing movement of the leaf spring for urging the tractor axle housing downwardly.

2. The combination of claim 1 wherein said plate is substantially triangular and provided with laterally extending flange on the top and rear edge thereof, with the top edge having the flat leaf spring attached thereto for a major portion of its length.

3. The combination of claim 1 wherein said drawbar assembly includes a swinging drawbar mounted thereon whereby the line of application of force to the drawn implement may be varied.

4. A drawbar assembly for attachment to the rear of a tractor comprising a pair of spaced rearwardly extending beams, a depending support strap at the front of each beam, a pair of pivot links connected to said straps at a point below the beams, a generally U-shaped drawbar having forwardly extending legs connected with said links above the lower ends of the straps, means movably supporting the rear portion of the drawbar from the beams, a transverse member at the front ends of the legs of the drawbar with the transverse member projecting beyond the straps for engagement therewith during forward movement of the drawbar thereby limiting the forward movement thereof, and a spring assembly interconnecting the drawbar and the straps for imparting downward force to the straps when rearward pulling force is exerted on the drawbar.

5. The combination of claim 4 wherein said spring assembly includes a triangular-shaped plate having the apex pivotally attached to the drawbar, an elongated leaf spring extending long the base edge of the plate and secured rigidly thereto, said leaf spring extending forwardly with the front end thereof being connected to the straps whereby pivotal movement of the plate during rearward movement of the drawbar will flex the spring downwardly.

References Cited in the file of this patent

UNITED STATES PATENTS

| | | |
|---|---|---|
| 1,417,373 | Geiger | May 23, 1922 |
| 1,512,611 | Konetsky | Oct. 21, 1924 |
| 2,779,606 | Weitzel | June 29, 1957 |